United States Patent

Zander et al.

[11] Patent Number: 5,697,993
[45] Date of Patent: Dec. 16, 1997

[54] HARD WATER STAIN REMOVER FOR GLASS

[76] Inventors: Richard A. Zander; Jeffrey S. McKenzie, both of 10507 Gravelly Lk Dr. SW., Suite 15A-235, Tacoma, Wash. 98499

[21] Appl. No.: 743,008

[22] Filed: Nov. 1, 1996

[51] Int. Cl.⁶ ..................... C09G 1/02
[52] U.S. Cl. ..................... 51/308; 106/3
[58] Field of Search ............ 106/3; 51/307, 51/308

[56] References Cited

U.S. PATENT DOCUMENTS 4,544,377  10/1985  Schwen ......................... 106/3
5,575,837  11/1996  Kodama et al. ................ 106/3

*Primary Examiner*—Deborah Jones

[57] ABSTRACT

This invention is directed to a hard water stain remover for glass and glazed surfaces consisting of 20 lbs. pumice powder and 8 oz. walnut shell powder.

1 Claim, No Drawings

HARD WATER STAIN REMOVER FOR GLASS

This invention is directed to a hard water stain remover which removes the toughest hard water stains from all glass and glazed surfaces.

TECHNICAL FIELD

The field of endeavor is the removal of hard water stains from glass or glazed surfaces.

SUMMARY OF INVENTION

The hard water stain remover removes hard water stains from glass or any glazed surface such as porcelain or tile. It gives people a safer way to totally remove these spots and stains. The stain remover does not contain any acid or caustic chemicals which other cleaners all contain.

DETAILED DESCRIPTION

The hard water stain remover consists of a mixture of 20 lbs. of (I) pumice ($SiO2$) and (II) 8 oz. walnut shell powder. Once mixed, the mixture is sprinkled onto a dampened non-scratch white scrubby pads applied to the affected area and rubbed in circular motion until the stains disappear. The mixture may be rinsed or wiped with clean dry cloth.

We claim:

1. A hard water stain remover for glass and glazed surfaces consisting of a mixture of 20 lbs. pumice powder and 8 oz. walnut shell powder.

* * * * *